(12) United States Patent
Bangs et al.

(10) Patent No.: US 11,391,377 B2
(45) Date of Patent: Jul. 19, 2022

(54) HYDRAULIC SEAL

(71) Applicant: Eaton Intelligent Power Limited, Dublin (IE)

(72) Inventors: Drew Bangs, Foster, RI (US); Brandon McLaren, Rehoboth, MA (US); Kalabandi Srinivasa Shruti, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 13 days.

(21) Appl. No.: 17/097,832

(22) Filed: Nov. 13, 2020

(65) Prior Publication Data
US 2021/0148470 A1 May 20, 2021

(30) Foreign Application Priority Data
Nov. 15, 2019 (IN) .............................. 201911046563

(51) Int. Cl.
*F16J 15/40* (2006.01)
(52) U.S. Cl.
CPC .................................. *F16J 15/40* (2013.01)
(58) Field of Classification Search
CPC .. F16J 15/40; F16J 15/44; F16J 15/441; F16J 15/442; F16J 15/443
See application file for complete search history.

(56) References Cited

U.S. PATENT DOCUMENTS

| 5,145,189 | A | * | 9/1992 | Pope | ..................... F16J 15/441 |
|---|---|---|---|---|---|
| | | | | | 277/544 |
| 7,770,895 | B2 | | 8/2010 | Zheng et al. | |
| 7,914,007 | B2 | | 3/2011 | Berard et al. | |
| 9,714,712 | B2 | | 7/2017 | Kiernan | |
| 10,337,619 | B2 | | 7/2019 | Ruggeri | |
| 2008/0042364 | A1 | | 2/2008 | Zheng et al. | |
| 2012/0223490 | A1 | | 9/2012 | Ruggeri et al. | |
| 2014/0062024 | A1 | * | 3/2014 | Bidkar | ..................... F01D 11/04 |
| | | | | | 277/303 |
| 2014/0119912 | A1 | * | 5/2014 | Bidkar | .................. F01D 11/025 |
| | | | | | 277/412 |
| 2017/0051621 | A1 | * | 2/2017 | Ackermann | ............ F01D 9/065 |
| 2018/0372225 | A1 | | 12/2018 | Ruggeri | |
| 2021/0054937 | A1 | * | 2/2021 | Chuong | ................ F01D 11/025 |

\* cited by examiner

*Primary Examiner* — Gilbert Y Lee
(74) *Attorney, Agent, or Firm* — Merchant & Gould P.C.

(57) ABSTRACT

A segment of a seal assembly for sealing against a rotating member can include a main body extending between first and second sides and defining a radial outer surface and a radial inner surface for sealing against the rotating member, a plateau surface defining a portion of the radial inner surface, and a first transverse groove defined in the main body, the first transverse groove defining a portion of the radial inner surface and being for maintaining a pressure around portions of the segment. The segment can further include a primary pad defining a portion of the main body radial inner surface and being located at or in proximity to the first transverse groove, and can further include a secondary pad defined within the main body and located between the plateau surface and the radial outer surface, the secondary pad being radially concealed behind the plateau surface.

20 Claims, 7 Drawing Sheets

HYDRAULIC SEAL

RELATED APPLICATION

This application claims priority to India Patent Application Serial Number 201911046563, filed on Nov. 15, 2019, the entirety of which is incorporated by reference herein.

BACKGROUND

Segmented carbon radial or circumferential seals are known. Such seals are commonly used to provide a fluid seal between a rotating component, such as a shaft, and a non-rotating component. Many aircraft and industrial gas turbines apply circumferential segmented seals in severe environment applications requiring high reliability and long life. Segmented carbon seals are also used as barrier seals in industrial compressors. Such seals are ideal in applications where long axial movements are anticipated due to thermal or mechanical phenomena usually found in today's rotor-machinery systems. In some implementations, hydrodynamic arrangements are machined into the carbon element of the seal. However, as the carbon element is the wear element in the seal assembly, the hydrodynamic arrangements begin to disappear which can have a negative effect on hydrodynamic performance.

SUMMARY

A segment of a seal assembly for sealing against a rotating member is disclosed. The segment can include a main body extending between first and second sides and defining a radial outer surface and a radial inner surface for sealing against the rotating member and can include a first transverse groove defined in the main body, the first transverse groove being for maintaining a pressure around portions of the segment. The segment can further include a hydrodynamic arrangement including a primary pad defining a portion of the main body radial inner surface and being located at or in proximity to the first transverse groove, and can further include a secondary pad defined within the main body, at least a portion of which being located radially between the primary pad and the radial outer surface.

In some examples, when the segment radial inner surface is in an initial unworn state, the secondary pad is concealed radially behind a plateau surface of the radial inner surface.

In some examples, when the segment radial inner surface is in a subsequent worn state, a portion of the plateau surface is worn away to expose at least a portion of the secondary pad such that the secondary pad defines a portion of the radial inner surface.

In some examples, the secondary pad extends through the main body first side.

In some examples, the secondary pad extends from a first end to a second end, wherein the first end is close to the radial inner surface in comparison to the second end.

In some examples, the segment can include a second transverse groove defined in the main body, wherein the second pad is located between the first and second transverse grooves.

In some examples, the primary pad includes a ramped portion.

In some examples, the primary pad includes a scooping groove between the ramped portion and the transverse groove.

In some examples, the at least one hydrodynamic feature includes a plurality of hydrodynamic features.

A segment of a seal assembly for sealing against a rotating member can include a main body extending between first and second sides and defining a radial outer surface and a radial inner surface for sealing against the rotating member, a plateau surface defining a portion of the radial inner surface, and a first transverse groove defined in the main body, the first transverse groove defining a portion of the radial inner surface and being for maintaining a pressure around portions of the segment. The segment can further include a hydrodynamic arrangement including a primary pad defining a portion of the main body radial inner surface and being located at or in proximity to the first transverse groove, and can further include a secondary pad defined within the main body and located between the plateau surface and the radial outer surface, the secondary pad being radially concealed behind the plateau surface.

In some examples, the segment radial inner surface is in a subsequent worn state, a portion of the plateau surface is worn away to expose at least a portion of the secondary pad such that the secondary pad defines a portion of the radial inner surface.

In some examples, the secondary pad extends through the main body first side.

In some examples, the secondary pad extends from a first end to a second end, wherein the first end is close to the radial inner surface in comparison to the second end.

In some examples, the segment further includes a second transverse groove defined in the main body, wherein the second pad is located between the first and second transverse grooves.

In some examples, the primary pad includes a ramped portion.

In some examples, the primary pad includes a scooping groove between the ramped portion and the transverse groove.

In some examples, the at least one hydrodynamic feature includes a plurality of hydrodynamic features.

A seal assembly can include, optionally, a flange assembly defining an annulus for receiving a rotating component and a plurality of segment received into the flange to define an annulus for receiving and forming a seal with a rotating component. Each of the segments can include a main body extending between first and second sides and defining a radial outer surface and a radial inner surface for sealing against the rotating member, a plateau surface defining a portion of the radial inner surface, and a first transverse groove defined in the main body, the first transverse groove defining a portion of the radial inner surface and being for maintaining a pressure around portions of the segment. The segment can further include a hydrodynamic arrangement including a primary pad defining a portion of the main body radial inner surface and being located at or in proximity to the first transverse groove, and can further include a secondary pad defined within the main body and located between the plateau surface and the radial outer surface, the secondary pad being radially concealed behind the plateau surface.

In some examples, for each segment, when the segment radial inner surface is in a subsequent worn state, a portion of the plateau surface is worn away to expose at least a portion of the secondary pad such that the secondary pad defines a portion of the radial inner surface.

In some examples, for each segment, the secondary pad extends through the main body first side.

In some examples, for each segment, the secondary pad extends from a first end to a second end, wherein the first end is close to the radial inner surface in comparison to the second end.

In some examples, for each segment, a second transverse groove is defined in the main body, wherein the second pad is located between the first and second transverse grooves.

In some examples, wherein, for each segment, the primary pad includes a ramped portion.

In some examples, wherein, for each segment, the primary pad includes a scooping groove between the ramped portion and the transverse groove.

In some examples, the at least one hydrodynamic feature includes a plurality of hydrodynamic features.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
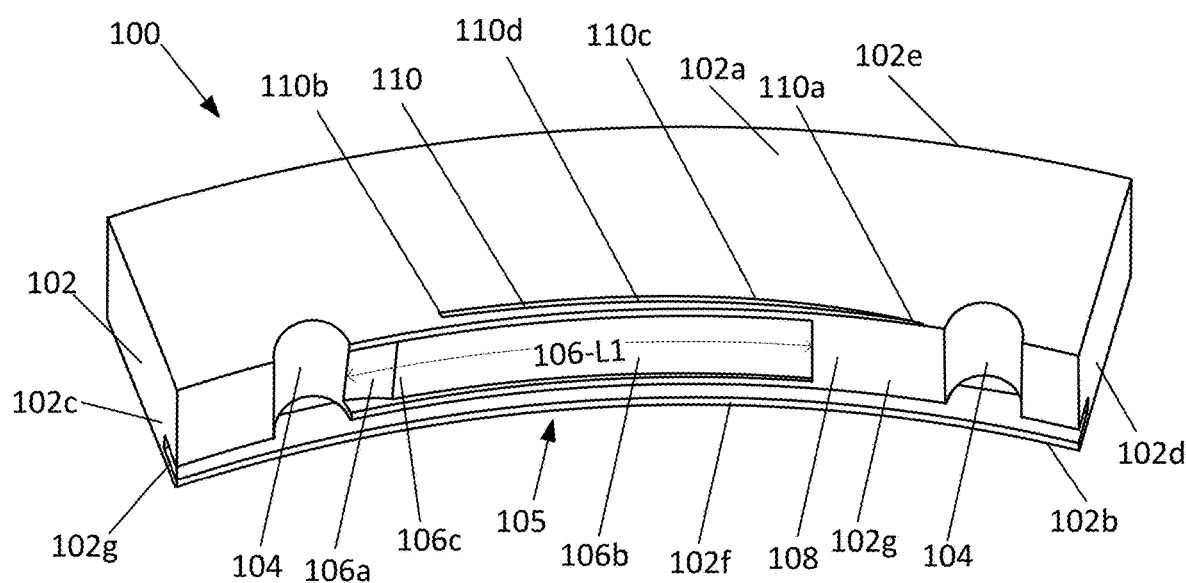
FIG. 1 is a perspective view of a schematic representation of a hydrodynamic seal segment in accordance with the present disclosure, wherein the hydrodynamic seal is in an unworn state.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

Figure 10:
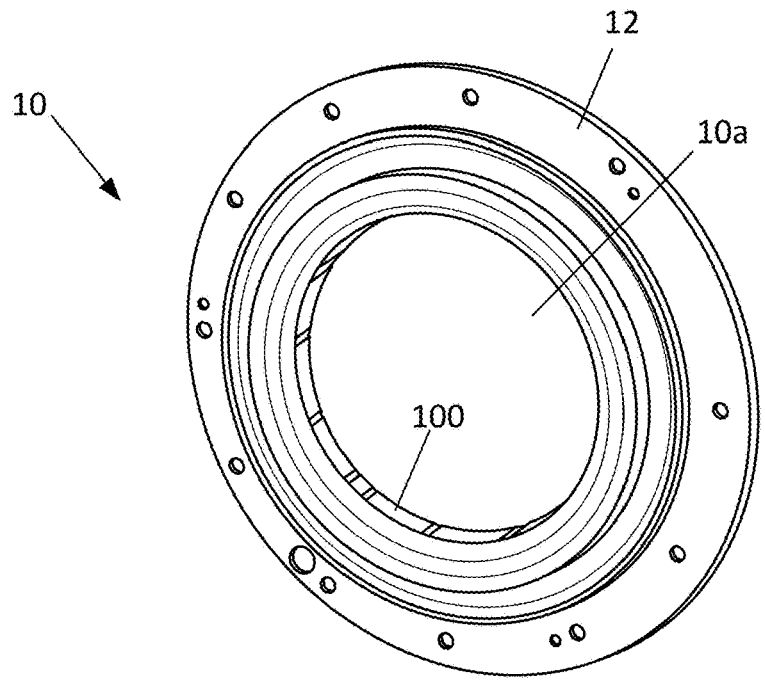
FIG. 10 is a schematic representation of a circumferential segmented seal assembly within which multiples of the hydrodynamic seal segment of FIG. 1 may be used.
Figure 11:
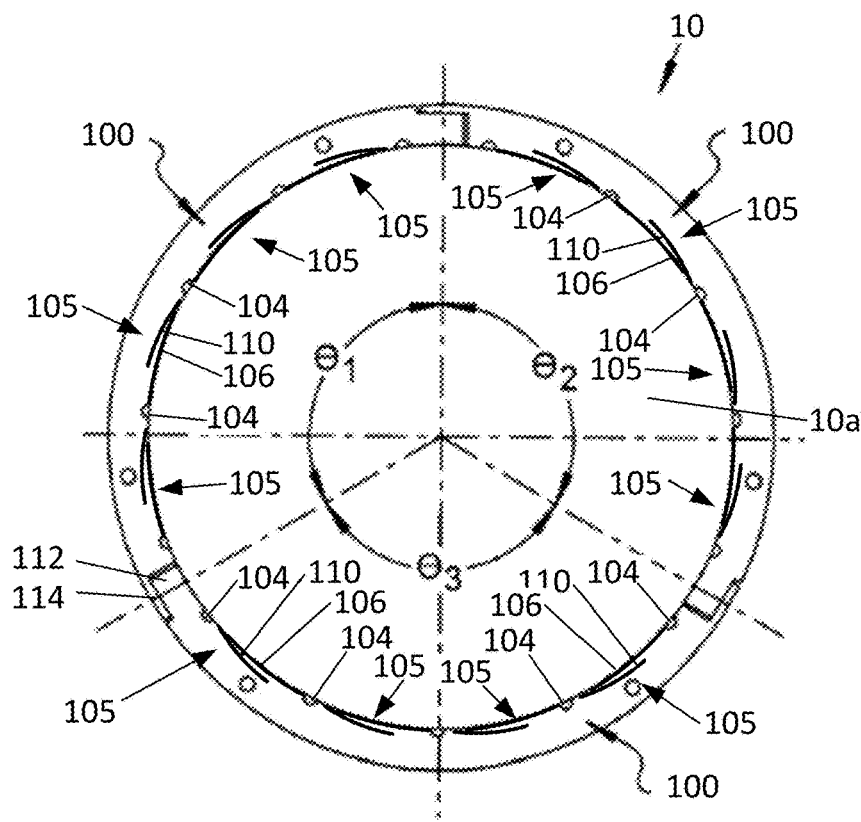
FIG. 11 is a schematic representation of a plurality of seal segments of the assembly shown in FIG. 10.
Figure 12:
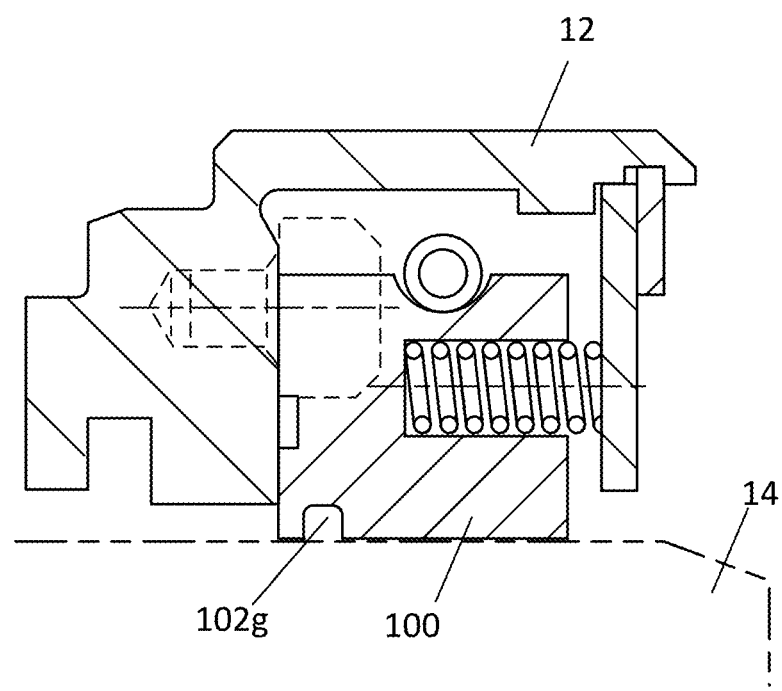
FIG. 12 is a schematic cross sectional view of the seal assembly shown in FIG. 3 in an installed application with a rotating shaft.

Referring to FIGS. 1 to 9, a segment 100 of a seal assembly 10 for sealing against a rotating member is disclosed. The segment 100 may be used in a seal assembly of the type shown and described in U.S. Pat. No. 7,770,895, the entirety of which is incorporated by reference herein. The segment 100 may be used in a circumferential segmented seal assembly 10, as shown at FIGS. 10 to 12. In one aspect, the circumferential seal assembly 10 is shown as including a plurality of adjacently arranged segments 100 supported by a flange assembly 12. With continued reference to FIGS. 10 to 12, it can be seen that the seal assembly 10 defines an annulus 10a through which a shaft 14 can extend such that the segments 100 are oriented about the shaft 14 to provide a seal.

In one aspect, the segment 100 includes an arc-shaped main body 102 extending between first and second sides 102a, 102b and extending between a first and second ends 102c, 102d. In one example, the main body 102 is formed from a material including carbon. The first and second ends 102c, 102d are oriented at an angle to each other such that multiple segments can be combined to form a ring. Accordingly, the angular range defined between the first and second ends 102c, 102d will typically be a multiple of 360°, such as 72°, 90°, 120°, or 180°. In the example shown at FIGS. 10 and 11, three segments 100 are provided that each form a 120° ($\theta_1$, $\theta_2$, $\theta_3$=120°) segment of a seal ring. Additionally, the segments 100 may include cooperating features 112, 114 intended to overlap or interconnect with an adjacent segment, as is depicted at FIG. 11. The main body 102 is further shown as defining a radial or circumferential outer surface 102e and a radial or circumferential inner surface 102f.

In one aspect, the radial inner surface 102f of each segment 100 is defined by one or more hydrodynamic arrangements 105 for facilitating sealing by controlling hydrodynamic fluid flow. For example, and schematically as shown at FIGS. 10 and 11, each of the segments 100 is provided with four such hydrodynamic arrangements 105, for a total of twelve hydrodynamic arrangements 105. It is noted that the segment 100 shown at FIGS. 1 to 9 shows only a single hydrodynamic arrangement 105 for the purpose of clarity. A segment 100 can be provided with a single hydrodynamic arrangement 105 or any number of desired arrangements 105.

In one aspect, each hydrodynamic arrangement 105 includes lift augmentation devices or primary pads 106 provided between a pair of transverse grooves 104. Each segment 100 is also shown as including peripheral grooves or flow channels 102g extending from the radial inner surface 102f towards the radial outer surface 102e between the first and second ends 102c, 102d. In the example shown, the grooves or flow channels 102g form a continuous, ring-shaped annular channel once the segments 100 are joined to form a ring. As shown, the transverse grooves 104, which are spaced apart from each other, are generally semi-circular shaped and extend between the main body first side 102a to the flow channel 102g. In one aspect, the length of the transverse grooves 104 is orthogonal or transverse to the first and second sides 102a, 102b.

In one aspect, the primary pad 106 extends between the transverse grooves 104, the first side 102a, and the flow channel 102g. As shown, the primary pad 106 can include a scooping groove 106a adjacent one of the transverse grooves 104, a ramped portion 106b extending towards the scooping groove 106a, and a transition portion 106c connecting the scooping groove 106a and the ramped portion 106b. In one aspect, the ramped portion 106b defines a channel or groove in the radial inner surface 102f that deepens as the ramped portion 106b progresses towards the scooping groove 106a and the proximate transverse groove 104. At the transition portion 106c, the scooping groove 106a begins and deepens at a greater rate than the ramped portion 106b as the scooping groove 106a eventually intersects with the proximate transverse groove 104. The remaining surface portions of the radial inner surface 102f not defining the transverse grooves 104, flow channel 102g, and the primary pad 106 can be characterized as a plateau surface 108 that generally defines a surface with a curvature generally matching that of the rotating component to be sealed by the segment 100. In one aspect, the plateau surface 108 corresponds to a bore side of the segment 100 and provides a sealing surface against a rotating member, such as a shaft or runner. As such, the plateau surface 108 can be characterized as defining a sector of a hollow cylinder with the plateau surface 108 defining the inner radial surface of the sector. The plateau surface 108 can be therefore characterized as a concave surface, an inner circumferential surface, and/or an inner radial surface. In one aspect, the plateau surface 108 has a first portion 108a extending along a first side of the flow channel 102g and a second portion 108b extending along a second side of the flow channel 102g. Each of the first and second portions 108a, 108b has a matching radial surface curvature.

Figure 2:
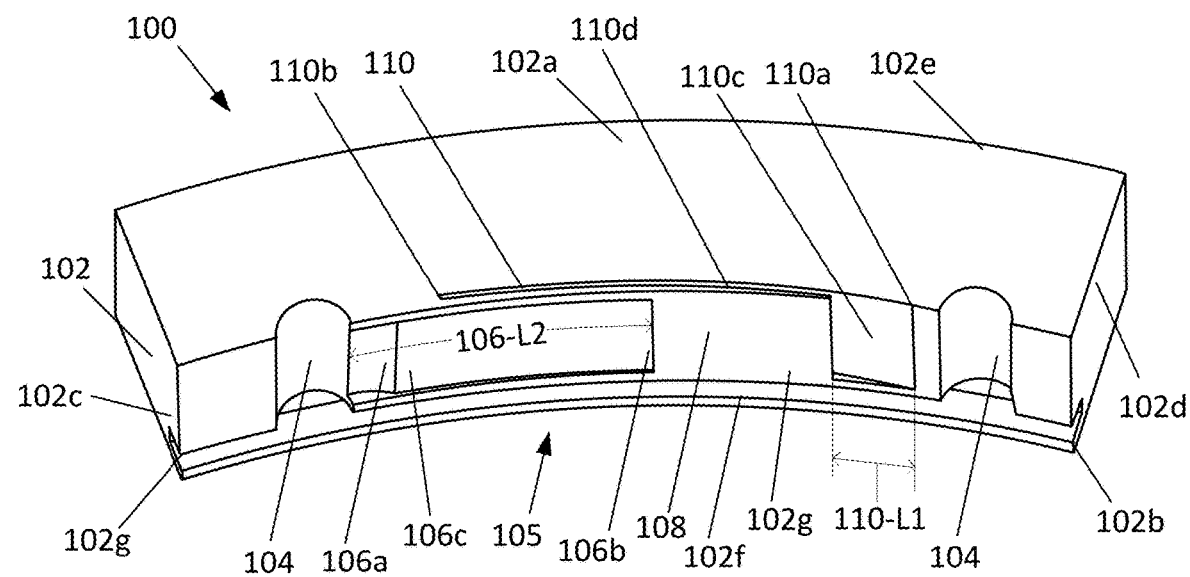
FIG. 2 is a perspective view of the hydrodynamic seal segment shown in FIG. 1, wherein the hydrodynamic seal is in a worn state.
Figure 3:
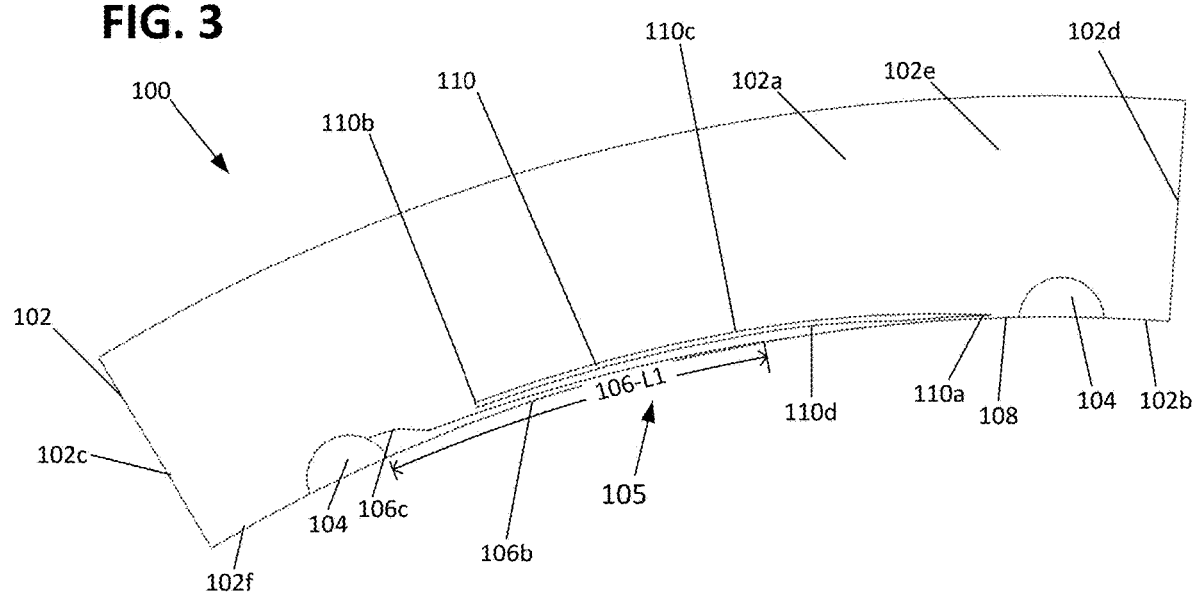
FIG. 3 is a side view of the hydrodynamic seal segment shown in FIG. 1, wherein the hydrodynamic seal is in an unworn worn state.
Figure 4:
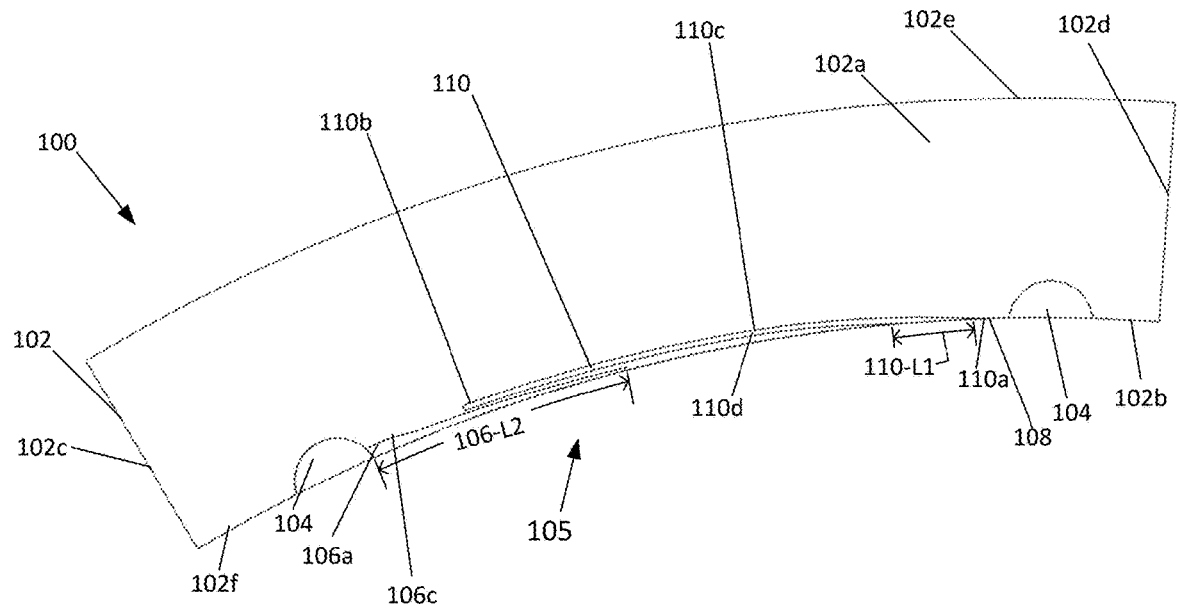
FIG. 4 is a side view of the hydrodynamic seal segment shown in FIG. 3, wherein the hydrodynamic seal is in a worn state.
Figure 5:
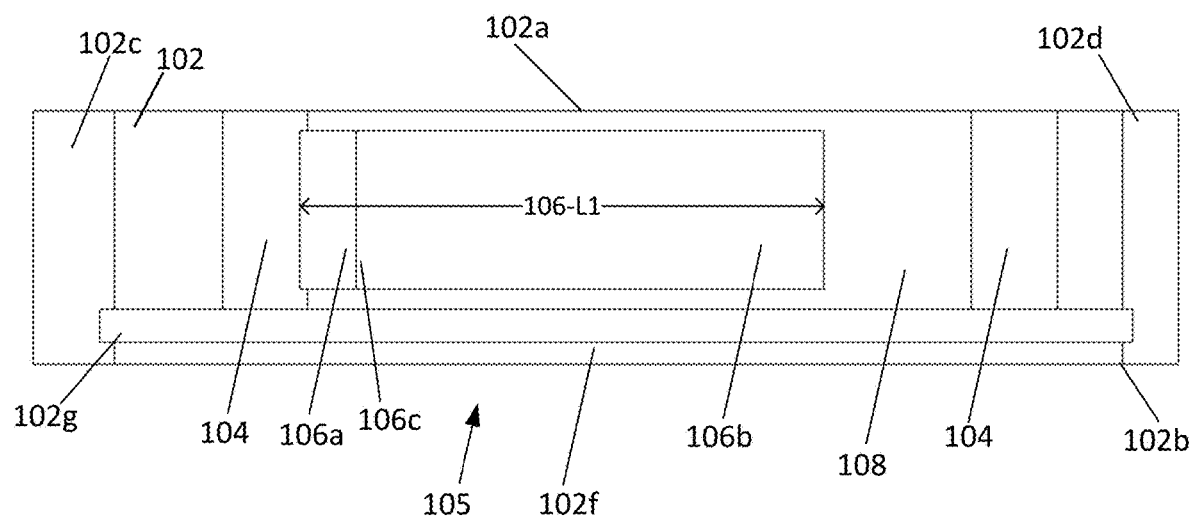
FIG. 5 is a top view of the hydrodynamic seal segment shown in FIG. 1, wherein the hydrodynamic seal is in an unworn worn state.
Figure 6:
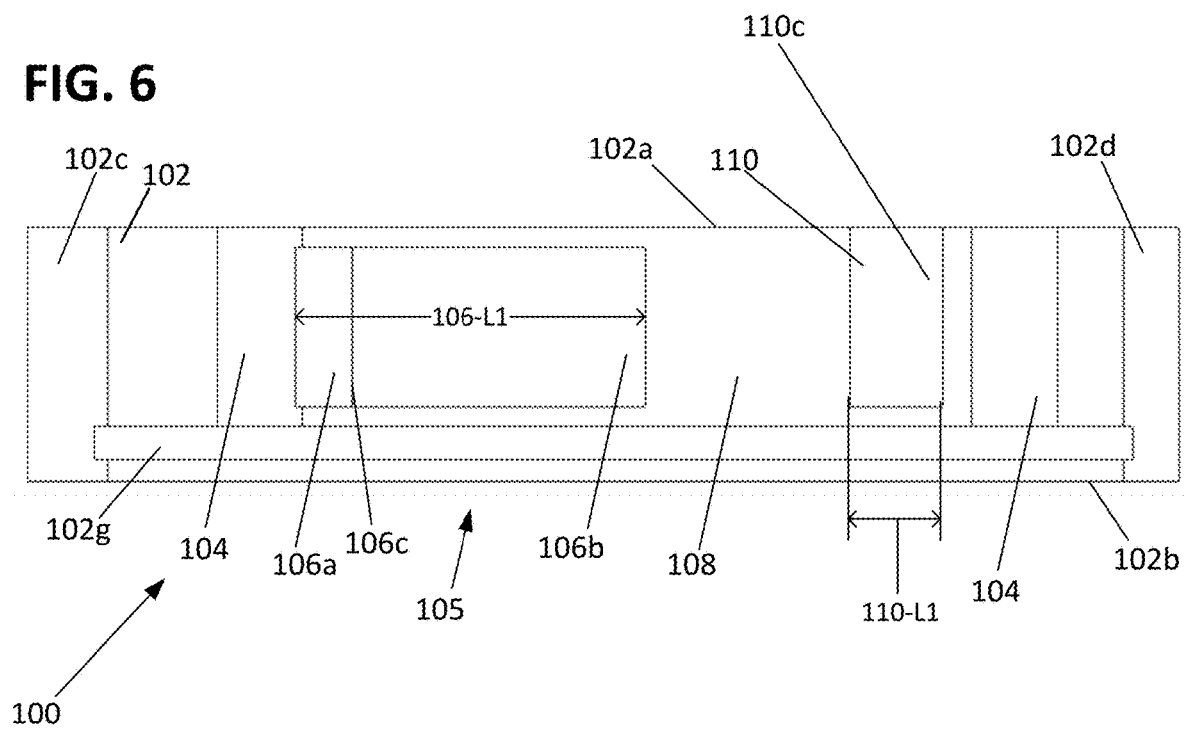
FIG. 6 is a top view of the hydrodynamic seal segment shown in FIG. 3, wherein the hydrodynamic seal is in a worn state.
Figure 7:
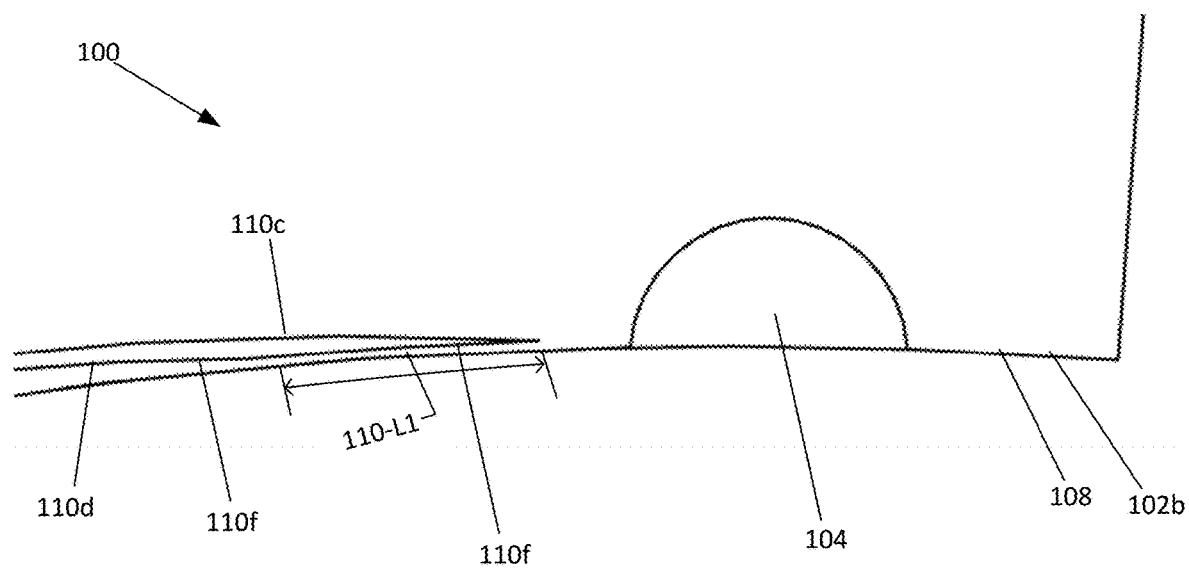
FIG. 7 is an enlarged side view of a portion of the hydrodynamic seal segment shown in FIG. 1.
Figure 8:
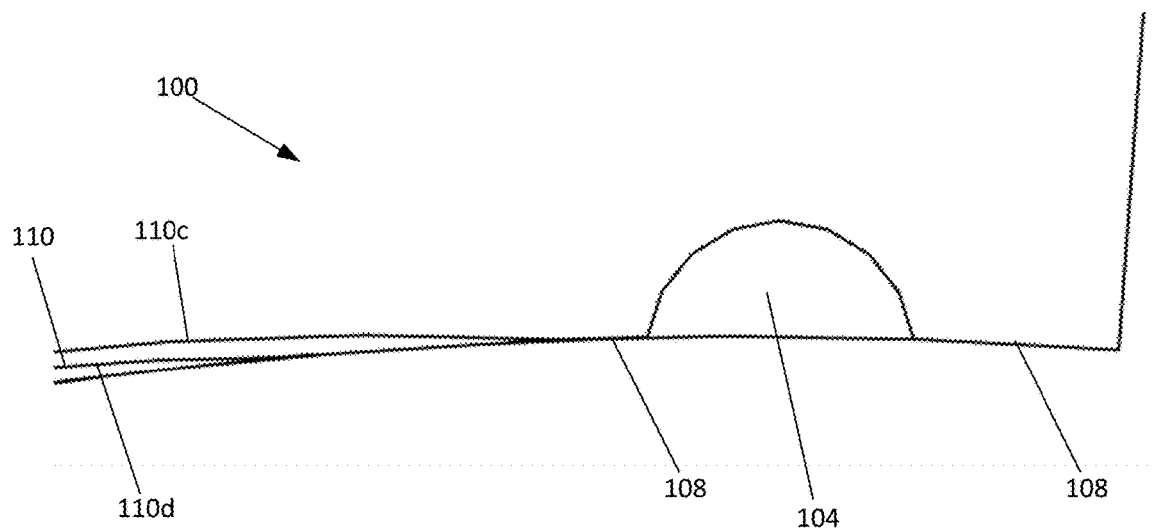
FIG. 8 is an enlarged side view of a portion of the hydrodynamic seal segment shown in FIG. 1.
Figure 9:
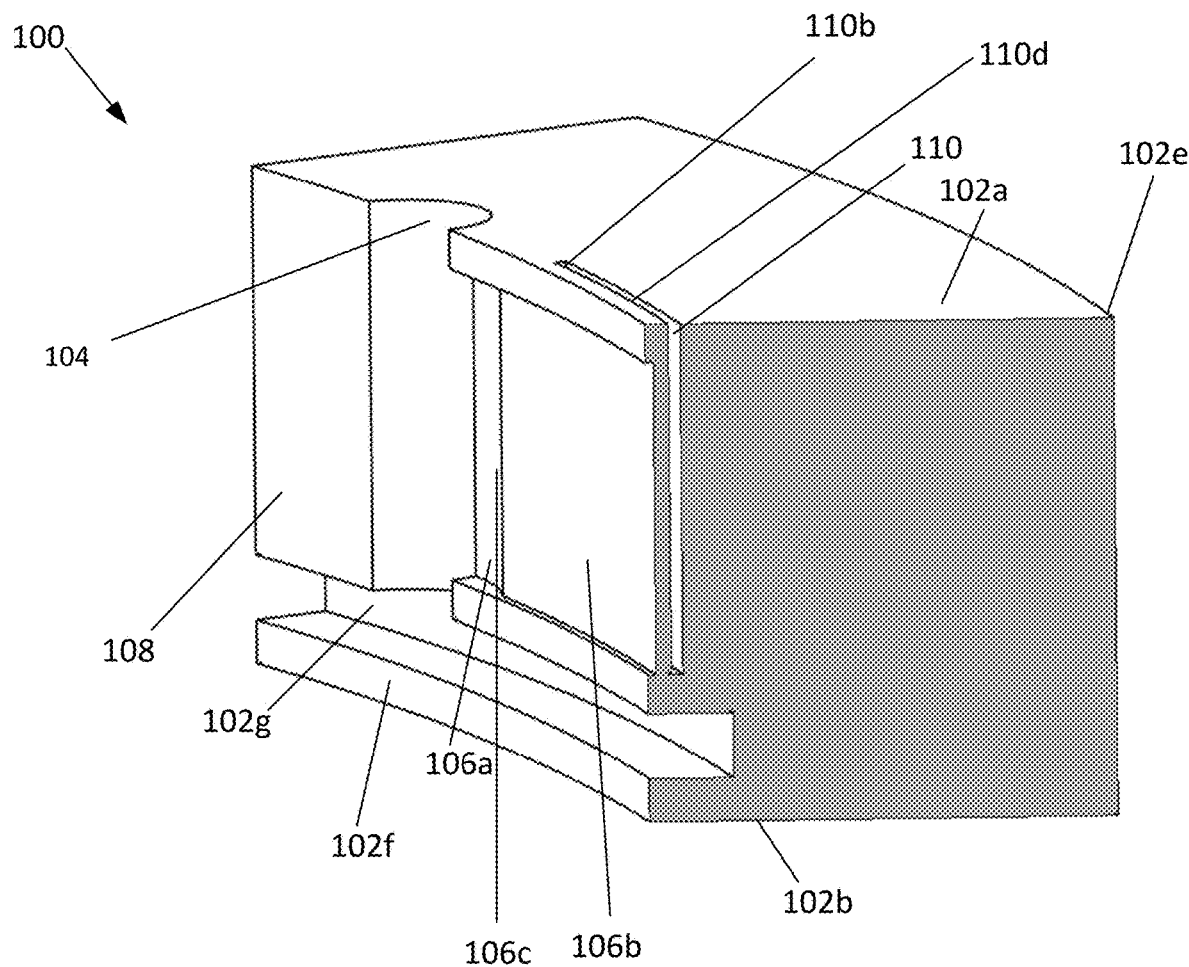
FIG. 9 is a cross-sectional perspective view of the hydrodynamic seal segment shown in FIG. 1.

In operation, the radial inner surface 102f of the segment 100 will eventually wear such that the ramped portion 106b of the primary pad 106 will become shallower and therefore shorten over time. FIG. 1 shows an unworn pad wherein the ramped portion 106b has an initial length 106-L1, as measured from the adjacent transverse groove 104. FIG. 2 shows a worn pad, wherein the ramped portion has a length 106-L2, also measured from the adjacent groove 104, that is significantly shorter than the initial length 106-L2. While the pad 106 is designed to account for some wear, performance of the pad is decreased over time due to such wear. To offset or mitigate this decrease in performance, the segment 100 is additionally provided with a secondary pad 110 that is initially concealed behind the plateau surface 108 and only becomes active or exposed once the plateau surface 108 has worn to a predetermined degree.

Referring back to FIG. 1, the secondary pad 110 is shown as extending from a first end 110a to a second end 110b, generally located between the transverse grooves 104. In one aspect, the secondary pad 110 has a radial outer wall surface 110c and a spaced apart radial inner wall surface 110d that extends from the segment main body first side 102a towards the second side 102b to a depth generally matching that of the ramped portion 106. In an unworn state, the secondary pad 110 is spaced from and concealed behind the plateau surface 108 such that a portion of the secondary pad 110 is located between the plateau surface 108 and the radial outer surface 102e and such that a portion of the secondary pad 110 is located between the primary pad 106 and the radial outer surface 102e. Accordingly, the secondary pad 110 can be characterized as being concealed, dormant, or hibernating when the segment 100 is in an unworn state. In examples, the surfaces 110c and/or 110d of the secondary pad 110 are oriented in a non-parallel or oblique angle to the plateau surface 108. In examples, the angle between the plateau surface 108 and the secondary pad 110, is an acute angle. In examples, the angle between the plateau surface 108 and the secondary pad 110 is less than 10 degrees. In examples, the surfaces 110c and/or 110d of the secondary pad 110 are oriented such that the first end 110a is closer to the plateau surface in comparison to the second end 110b. Accordingly, as the plateau surface 108 wears, the first end 110a of the secondary pad 110 will be initially exposed such that the radial inner wall surface 110d is worn away to expose the radial exterior wall surface 110d to the radial inner surface 102f. As wear continues, an increasing length of the secondary pad 110 being exposed towards the second end 110b. In examples, a portion of the secondary pad 110 is located between the primary pad 106, in an unworn state, and the circumferential outer surface 102e of the seal segment 100. In examples, a majority of the overall length of the secondary pad 110 is located between the primary pad 106, in an unworn state, and the circumferential outer surface 102e of the seal segment 100.

Referring to FIG. 2, sufficient wear through the plateau surface 108 has occurred such that a length 110-L1 of the secondary pad 110 is exposed. This length 110-L1 is able to replace at least a portion of the primary pad length 106-L1 that has been lost due to the same wear. Accordingly, once exposed, the secondary pad 110 is able to regain some of the hydrodynamic performance losses due to the wear of the primary pad 106. As most easily viewed at FIG. 7, the radial inner wall 110d can include a first segment 110e extending from the first end 110a and can include an adjoining second segment 110f extending at a non-zero angle from the first segment 110e to the second end 110b. In the example shown, the segment 110e is generally parallel to the plateau surface 108 while the segment 110f is generally parallel to the outer radial outer wall surface 110c. Accordingly, when the plateau portion 108 wears sufficiently, the segment 110e will erode away such that the secondary pad 110 is exposed with a predetermined initial length. In the example shown, the predetermined length is defined by the length of the segment 110e, which is shown as being equal to length 110-L1. As the plateau surface 108 wears further, the length of the secondary pad 110 will continue to increase from the predetermined length as the primary pad length continues to decrease. In examples, half or more of the radial inner wall surface 110d is parallel to the radial outer wall surface 110c. In some examples, the entire length of the radial inner wall surface 110d is parallel to the radial outer wall surface 110c. In some examples, the length 110-L1 is less than half the length 106-L1. In some examples, the length 110-L1 is about one quarter of the length 106-L1. In examples, the overall length of the secondary pad 110 is a half or more the overall length of the primary pad 106. In examples, the overall length of the secondary pad 110 is about the same as the overall length of the primary pad 106.

In operation, a seal assembly 10 of the general type shown schematically at FIG. 11, with a plurality of hydrodynamic arrangements 5, will provide a suitable hydrodynamic performance level when the primary pads 106 are in a completely unworn state. This performance level drops as the carbon of the primary pads wear 106. As the secondary pads 110 are completely hidden beneath the plateau surface 108 in the unworn state, the primary pads 106 operate as normal with no performance losses being caused by the secondary pads 110. As the carbon of the segments 100 wear to expose the secondary pads 110, the secondary pads 110 become active and begin to provide extra hydrodynamic performance to regain losses from the continually wearing primary pads 106. Accordingly, the disclosure provides for an advantageous approach in which a performance level of a seal assembly 10 is maintained at a higher level over a greater period of time, as compared to prior art designs not including a secondary pad of the type disclosed herein.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

We claim:

1. A segment of a seal assembly for sealing against a rotating member, the segment comprising:
   a) a main body extending between first and second sides and defining a radial outer surface and a radial inner surface for sealing against the rotating member;
   b) at least one hydrodynamic arrangement including:
      i) a first transverse groove defined in the main body and being for maintaining a pressure around portions of the segment;
      ii) a primary pad defining a portion of the main body radial inner surface and being located at or in proximity to the first transverse groove; and
      iii) a secondary pad defined within the main body, at least a portion of which is located radially between the primary pad and the radial outer surface.

2. The segment of claim 1, wherein, when the radial inner surface is in an initial unworn state, the secondary pad is concealed radially behind a plateau surface of the radial inner surface.

3. The segment of claim 2, wherein, when the radial inner surface is in a subsequent worn state, a portion of the plateau surface is worn away to expose at least a portion of the secondary pad such that the secondary pad defines a portion of the radial inner surface.

4. The segment of claim 1, wherein the secondary pad extends through the main body first side.

5. The segment of claim 1, wherein the primary pad includes a ramped portion.

6. The segment of claim 1, wherein the secondary pad extends from a first end to a second end, wherein the first end is closer to the radial inner surface in comparison to the second end.

7. The segment of claim 1, further including a second transverse groove defined in the main body, wherein the secondary pad is located between the first and second transverse grooves.

8. The segment of claim 5, wherein the primary pad includes a scooping groove between the ramped portion and the transverse groove.

9. The segment of claim 1, wherein the at least one hydrodynamic feature includes a plurality of hydrodynamic features.

10. A segment of a seal assembly for sealing against a rotating member, the segment comprising:
    a) a main body extending between first and second sides and defining a radial outer surface and a radial inner surface for sealing against the rotating member;
    b) a plateau surface defining a portion of the radial inner surface; and
    c) at least one hydrodynamic arrangement including:
       i) a first transverse groove defined in the main body and defining a portion of the radial inner surface, the first transverse groove being for maintaining a pressure around portions of the segment;
       ii) a primary pad defining a portion of the main body radial inner surface and being located at or in proximity to the first transverse groove; and
       iii) a secondary pad defined within the main body and located between the plateau surface and the radial outer surface, the secondary pad being radially concealed behind the plateau surface.

11. The segment of claim 10, wherein, when the segment radial inner surface is in a subsequent worn state, a portion of the plateau surface is worn away to expose at least a portion of the secondary pad such that the secondary pad defines a portion of the radial inner surface.

12. The segment of claim 10, wherein the secondary pad extends through the main body first side.

13. The segment of claim 10, wherein the secondary pad extends from a first end to a second end, wherein the first end is closer to the radial inner surface in comparison to the second end.

14. The segment of claim 10, further including a second transverse groove defined in the main body, wherein the secondary pad is located between the first and second transverse grooves.

15. The segment of claim 10, wherein the primary pad includes a ramped portion and a scooping groove located between the ramped portion and the first transverse groove.

16. A seal assembly comprising:
    a) a plurality of arc-shaped segments joined together to define an annulus for receiving and forming a seal with a rotating component, each of the plurality of segments including:
       i) a main body extending between first and second sides and defining a radial outer surface and a radial inner surface for forming a seal with the rotating component;
       ii) a plateau surface defining a portion of the radial inner surface; and
       iii) at least one hydrodynamic arrangement including:
          1) a first transverse groove defined in the main body and defining a portion of the radial inner surface, the first transverse groove being for maintaining a pressure around portions of the segment;
          2) a primary pad defining a portion of the main body radial inner surface and being located at or in proximity to the first transverse groove; and
          3) a secondary pad defined within the main body and located between the plateau surface and the radial outer surface, the secondary pad being radially concealed behind the plateau surface.

17. The seal assembly of claim 16, wherein, for each segment, when the radial inner surface is in a subsequent worn state, a portion of the plateau surface is worn away to expose at least a portion of the secondary pad such that the secondary pad defines a portion of the radial inner surface.

18. The seal assembly of claim 16, wherein, for each segment, the secondary pad extends from a first end to a second end, wherein the first end is closer to the radial inner surface in comparison to the second end.

19. The seal assembly of claim 16, further including, for each segment, a second transverse groove defined in the main body, wherein the secondary pad is located between the first and second transverse grooves.

20. The seal assembly of claim 16, wherein, for each segment, the primary pad includes a ramped portion and a scooping groove located between the ramped portion and the first transverse groove.

\* \* \* \* \*